United States Patent
Kahle et al.

(10) Patent No.: US 6,430,678 B1
(45) Date of Patent: Aug. 6, 2002

(54) SCOREBOARD MECHANISM FOR SERIALIZED STRING OPERATIONS UTILIZING THE XER

(75) Inventors: James Allan Kahle; Hung Qui Le; Lee Evan Eisen, all of Austin; John Edward Derrick, Round Rock; Robert William Hay, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,463

(22) Filed: Jul. 29, 1999

(51) Int. Cl.[7] .................................................. G06F 9/30
(52) U.S. Cl. ...................................... 712/217; 712/244
(58) Field of Search ................................ 712/217, 244, 712/225, 227, 300; 703/26, 27

(56) References Cited

U.S. PATENT DOCUMENTS

| | | | |
|---|---|---|---|
| 4,875,160 A | * 10/1989 | Brown, III | 712/228 |
| 5,341,482 A | * 8/1994 | Cutler | 712/244 |
| 6,055,625 A | * 4/2000 | Nakada | 712/216 |

OTHER PUBLICATIONS

IBM Technical Disclosure Bulletin, Jun. 1992, IBM, NN9206345, vol. 35, Issue No. 1B, pp. 345–347.*
IBM Technical Disclosure Bulletin, Jan. 1993, IBM, NN9301395, vol. 36, Issue No. 1, pp. 395–396.*

* cited by examiner

Primary Examiner—Thomas Lee
Assistant Examiner—James K. Trujillo
(74) Attorney, Agent, or Firm—Anthony V. S. England; Bracewell & Patterson, L.L.P.

(57) ABSTRACT

An XER scoreboard function is provided by utilizing the instruction sequencer unit scoreboard. A scoreboard bit is set if the XER is being used by a previous instruction. If a new instruction is fetched that uses the XER, a dummy read to the XER is generated to test the scoreboard bit to determine if the scoreboard bit is set. If the scoreboard bit is not set when the dummy read is executed, the X-form string proceeds to execution. If the scoreboard bit is set when the dummy is executed, the pipeline is stalled until the scoreboard bit is cleared, and then the X-form string padded with generated padding IOPs (Dummy or NOPs) is executed. After an accessing instruction is executed, the scoreboard bit is cleared.

10 Claims, 4 Drawing Sheets

SCOREBOARD MECHANISM FOR SERIALIZED STRING OPERATIONS UTILIZING THE XER

RELATED APPLICATIONS

The present application is related to the subject matter of the following applications: Ser. No. 09/363,464, still pending entitled "Compressed String and Multiple Generation Engine" and filed Jul. 29, 1999; Ser. No. 09/263,667, still pending entitled "An Instruction Buffer Arrangement for a Superscalar Processor" and filed Mar. 5, 1999; Ser. No. 09/354,498, now U.S. Pat. No. 6,345,356 entitled "Method and Apparatus for Software Based Dispatch Stall Mechanism for Scoreboarded IOPs" and filed Jul. 16, 1999; and Ser. No. 09/345,161, now U.S. Pat. No. 6,321,380 entitled "Method and Apparatus for Modifying Instructions in a Superscalar Processor" and filed Jun. 29, 1999. The content of the above-referenced applications is incorporated herein by reference.

BACKGROUND OF THE INVENTION

1. Technical Field

The present invention generally relates to a superscalar processor in a data processing system and in particular to string operations within the processor. Still more particularly, the present invention relates to scoreboarding operations to a user-level register.

2. Description of the Related Art

Complex, high speed processors often utilize multiple reduced instruction set computer (RISC) processor cores which are generally characterized by high throughput of instructions. RISC processors have the ability to execute multiple instructions per clock cycle and are described as "superscalar." Superscalar processors, such as the PowerPC™ family of processors available from IBM Corporation of Armonk, N.Y., provide simultaneous dispatch of multiple instructions. Included in the processor are an Instruction Cache ("IC"), an Instruction Dispatch Unit ("IDU"), an Execution Unit ("EU") and a Completion Unit ("CU"). A typical RISC instruction set (PowerPC™) contains three broad categories of instructions: branch instructions (including specific branching instructions, system calls and Condition Register logical instructions); fixed point instructions and floating point instructions. Each group is executed by an appropriate function unit. While all instructions pass through an issue stage in order, the instructions may enter the execution stage out of order. Scoreboarding is utilized to allow instructions to execute out of order and to maintain a preset instruction execution rate. The scoreboard also controls when an instruction can write its result to a destination register.

Generally, a superscalar, RISC processor is "pipelined," meaning that a second instruction is waiting to enter the execution unit as soon as the previous instruction is finished. The processor includes a number of stages and an instruction is separated into components and operated on in each stage. In a typical first stage, instruction fetch, an instruction is fetched from memory. In a decode stage, the instruction is decoded into different control bits, which in general designate (1) a type of functional unit for performing the operation specified by the instruction, (2) source operands for the operation and (3) destinations for results of operations.

In a dispatch stage, the decoded instruction is dispatched per control bits to a unit having an execution stage or to an intervening reservation station which in turn issues the instruction to an associated execution stage (execution unit). The execution stage processes the operation as specified by the instruction by accepting one or more operands and producing one or more results in the order of available operands.

A completion stage maintains the correct architectural machine state by considering instructions residing in a completion buffer and utilizing information about the status of instructions provided by the execute stage. The completion stage deals with program issues that occur because of concurrently executed instructions that allow multiple instruction results to be loaded to a single register.

Some instructions, such as "move to" and "move from" instructions and condition register instructions, require serializing to execute properly. Also, serialization is required for all load/store multiple/string instructions. These string instructions are generally broken into a sequence of register-aligned operations and the first operation is usually dispatched with any preceding instructions in the dispatch buffer. Subsequent operations are dispatched at the rate of one word per cycle until finished.

A microcode unit, which generates sequences of Internal Operations (IOPs) that emulate X-form strings (instructions that use the string count field of an Integer Exception Register (XER) to determine how many bytes are to be moved), requires that the Integer Exception Register (XER) be valid before generating an appropriate sequence of IOPs. The XER is a 32-bit, user-level register and indicates overflow and carries for integer operations and is also used to retain instruction string length for string operations.

There is no explicit scoreboard mechanism within the microcode unit and implementation of a true scoreboard would be costly in both timing of the rename hardware and physical space on the processor. A scoreboard's function is to maintain a preset instruction rate per clock cycle and generally every instruction goes through the scoreboard, corresponding to instruction issue and replacing part of the instruction decode in the pipeline. It is undesirable to utilize scoreboard controls during action by the microcode unit due to the complexity and potential timing impact on critical path circuitry. Additionally, X-form string instructions have a built in delay for XER interlock and frequently there is no need for this delay because the XER string count is known.

It would be desirable therefore, to provide a scoreboard function that would allow an existing scoreboard to be utilized for scoreboarding an XER.

SUMMARY OF THE INVENTION

It is therefore one object of the present invention to provide a scoreboard function for operations relative to an integer exception register.

It is another object of the present invention to provide a method and apparatus that will allow an existing scoreboard function to stall a pipeline that is using microcode operations.

The foregoing objects are achieved as is now described. An XER scoreboard function is provided by utilizing the Instruction Sequencer Unit scoreboard. A scoreboard bit is generated and set if the XER is being used. If it is not being used, another instruction is fetched. If the XER is being used, a dummy read (mfXER) is generated to test the bit to determine if the XER is busy. Padding (dummy, or NOPs) IOPs are then issued and if the scoreboard bit is not set, the dummy XER Read will be executed and dispatch hold is not activated. After a padded X-form string has been executed—providing for a pipeline stall—the scoreboard bit is cleared.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a state machine diagram in accordance with the present invention.

DETAILED DESCRIPTION OF THE PREFERRED EMBODIMENT

Figure 1:
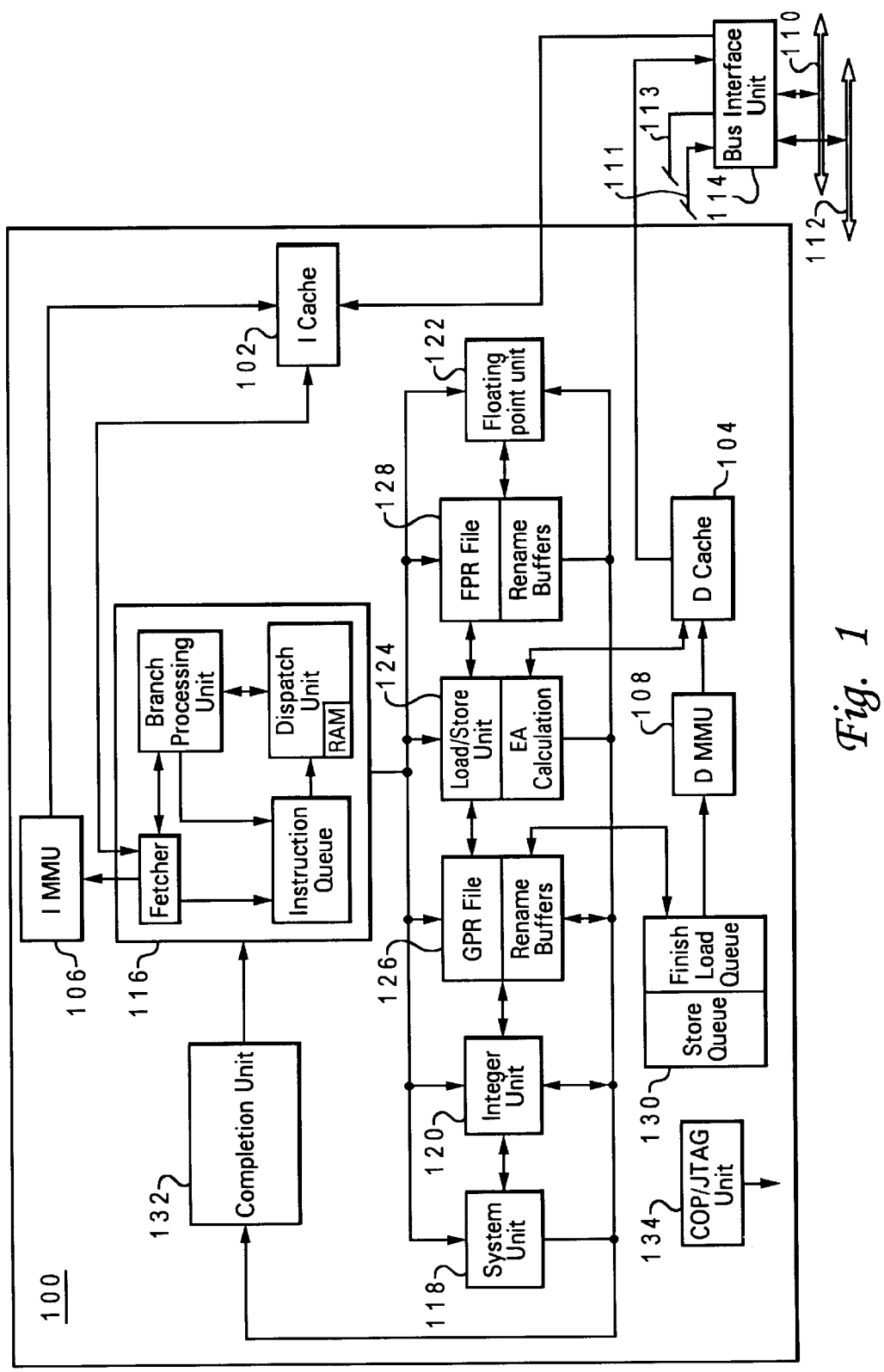
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented, is depicted. Processor 100 is a single integrated circuit superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques and may be used as a core in a more complex processor (as in the present invention).

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Bus interface unit 114 is also connected to a parallel and identical RISC processor core (not shown) via Data cache line 111 and Instruction cache line 113. Bus interface unit 114 shares both processor cores.

Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and dispatch unit.

The dispatch unit within instruction unit 116 dispatches instructions as appropriate to execution units such as system unit 118, integer unit 120, floating point unit 122, or load/ store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer registers 126 or floating point registers 128 as needed, and stores instructions' results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
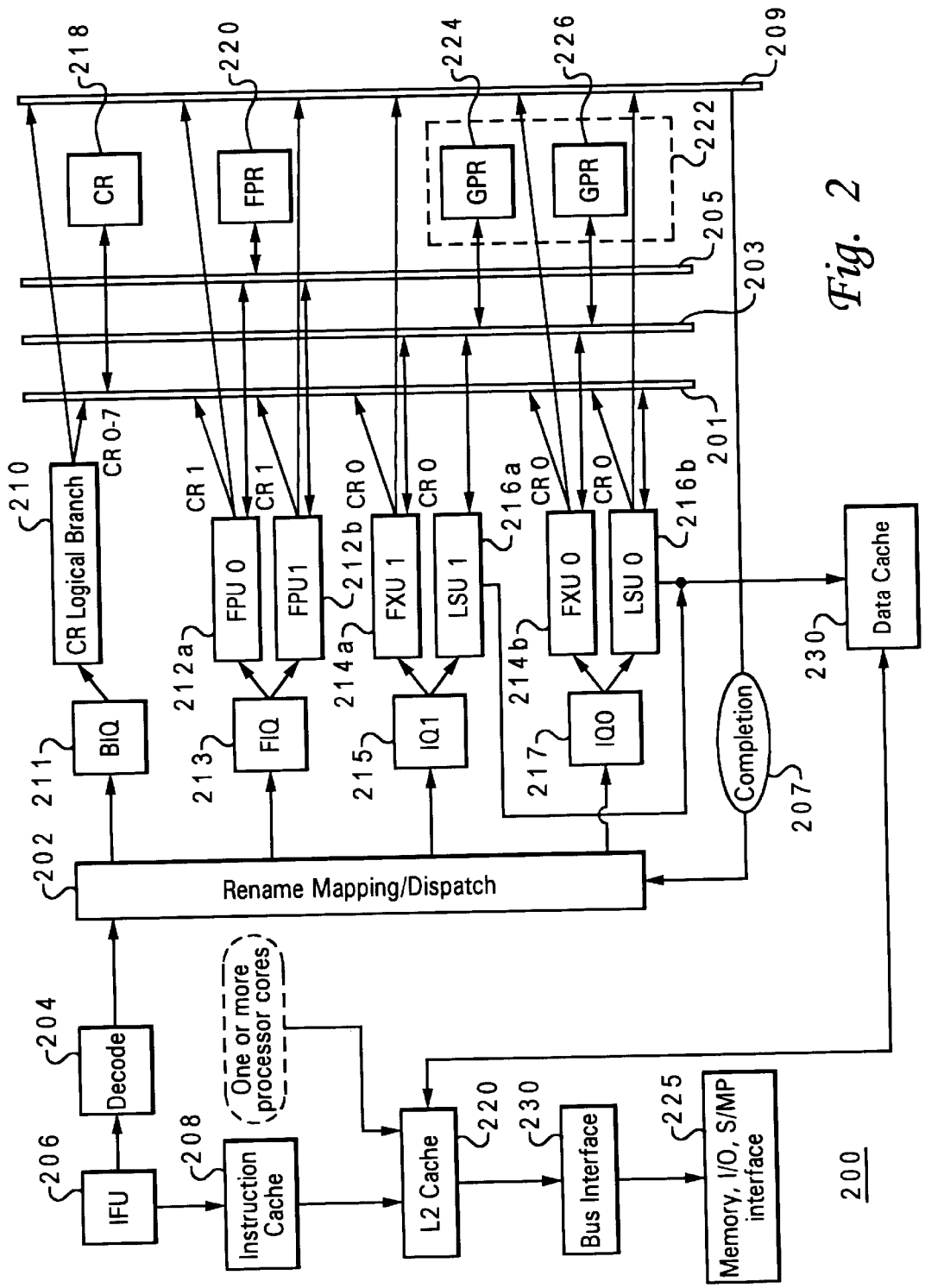
FIG. 2 is a block diagram of a superscalar processor in accordance with the present invention.

Referring to FIG. 2, a block diagram of a superscalar processor in accordance with a preferred embodiment of the present invention, is depicted. To index instructions properly as instructions become wider in complex processors, it is important to optimize the translation from the complex instruction set with a large amount of implicit information to an explicit instruction set that does not require the use of architected registers. It is sometimes important to decompose or translate those instructions into two or more instructions that may not have a direct relationship to the original instruction to allow for faster execution of such instructions.

Processor 200 includes instruction fetch unit (IFU) 206 which provides signals to decode unit 204 which utilizes rename mapping structure 202. Rename mapping structure 202 provides information directly to issue queues 211–217. The issue queues 211, 213, 215 and 217 in turn feed execution units 210, 212a–b, 214a–b, and 216a–b.

Instruction cache 208 stores instructions received from IFU 206. Data cache 230 receives data from execution units 216a and 216b. Level 2 (L2) cache 220 is utilized to store data and instructions from data cache 230 and instruction cache 208. Processor 200 includes bus interface unit (BIU) 230 which passes information between L2 and cache 220 and peripheral device interface 225 (i.e., memory, i/o device, mp).

In this embodiment, branch issue queue (BIQ) 211 provides information to condition register (CR) 218 or branch unit 210. The floating point issue queue (FIQ) 213 provides information to floating point units (FPUs) 212a and 212b. Issue queue (IQ) 215 provides information to fixed point unit (FXU) 214a and load/store unit (LSU) 216. IQ 217 provides information to FXU 214b and LSU 216b. Although the issue queues are arranged in the above-identified manner, one of ordinary skill in the art readily recognizes, that the issue queues can be arranged in a different manner and that arrangement would be within the spirit and scope of the present invention.

Conditional register 218 provides and receives information from CR bus 201. Floating point architectural registers (FPR) 220 provide and receive information from FPR bus 205. General purpose registers (GPR) 224 and 226 provide and receive information from GPR bus 203. Completion unit 207 provides information to rename mapping 202 via completion bus 209.

Branch unit 210 provides and receives information via CR bus 201 utilizing, in a preferred embodiment, conditional registers 0–7 (CR 0–7). FPU 212*a* and FPU 212*b* provides information to CR 218 via CR bus 201, utilizing in a preferred embodiment conditional register 1 CR1. FPU 212*a* and 212*b* also receive and provide information from and to FPR pool 220 via FPR bus 205. FXU 214*a*, FXU 214*b*, LSU 216*a*, LSU 216*b* output results to CR 218 via CR bus 201, utilizing in a preferred embodiment, conditional register 0 CR0. FXU 214*a*, FXU 214*b*, LSU 216*a* and LSU 216*b* also receive and provide information from and to GPR pool 222 via GPR bus 203. GPR pool 222 in a preferred embodiment is implemented utilizing a shadow GPR arrangement in which there are two GPRs 224 and 226. All of the execution units 210, 212*a*, 212*b*, 214*a*, 214*b*, 216*a* and 216*b* provide results to completion unit 207 via completion bus 209.

Figure 3A:
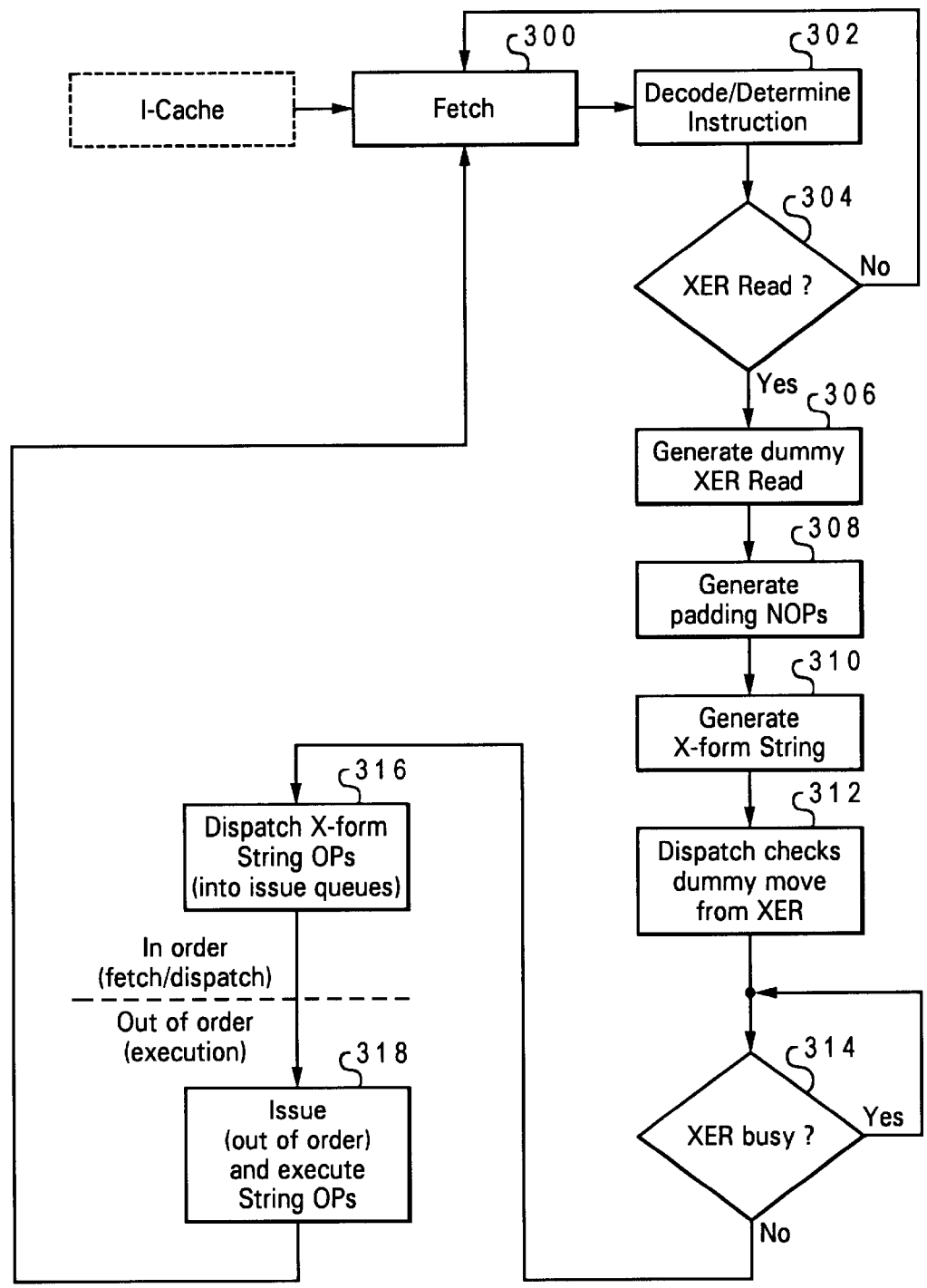
FIG. 3A depicts a method for scoreboarding an XER in accordance with a preferred embodiment of the present invention.

Referring now to FIG. 3A, a method for scoreboarding an XER in accordance with the present invention is depicted. The process begins with step 300, which depicts an instruction being fetched from the Instruction Cache. The process passes to step 302, which illustrates decoding the instruction. Next, the process proceeds to step 304, which depicts a determination of whether the decoded instruction uses the XER. An instruction uses the XER when it reads or writes the XER to determine the byte count for an X-form string instruction. If the instruction is not accessing the XER, the process returns to step 300 where the next instruction is fetched. Otherwise, the process then passes to step 306, which illustrates generating a dummy XER read or "move from XER" instruction (mfXER). The process then moves to step 308, which illustrates generating padding instructions (also known as "dummy" or NOPs). Thereafter, the process proceeds to step 310 which illustrates generating an X-form string to be used in the execution of the instruction.

The process then proceeds to decision block 312, which depicts the dummy "move from XER" instruction reaching the Dispatch Stage and triggering the Dispatch Stage to check the local scoreboard bit and determine if the XER is busy (as a function of the scoreboard bit). This determination is shown at decision block 314, where it is determined whether the scoreboard bit is set, and, therefore, the XER is busy. If the XER is busy, the Dispatch stage will stop the pipeline and not issue any instructions until the XER is no longer busy. In other words, dispatch is held after the dummy XER read (mfXER) is dispatched and until the dummy XER read is executed. The XER will be busy when a previous instruction is performing a write to the XER and the designated scoreboard bit in the Instruction Sequencer Unit is generated (set) to indicate the XER is busy. If the XER is not busy, the process proceeds to step 316, where the X-form string is dispatched into issue queues. Note that the instructions are passing from the "in order" fetch/dispatch stage to the "out of order" execution stage between steps 316 and 318. Then, at step 320, the X-string instructions are issued (out-of-order) and executed. Once execution is complete, the process returns to step 300, which illustrates fetching another instruction from the instruction cache.

Figure 3B:
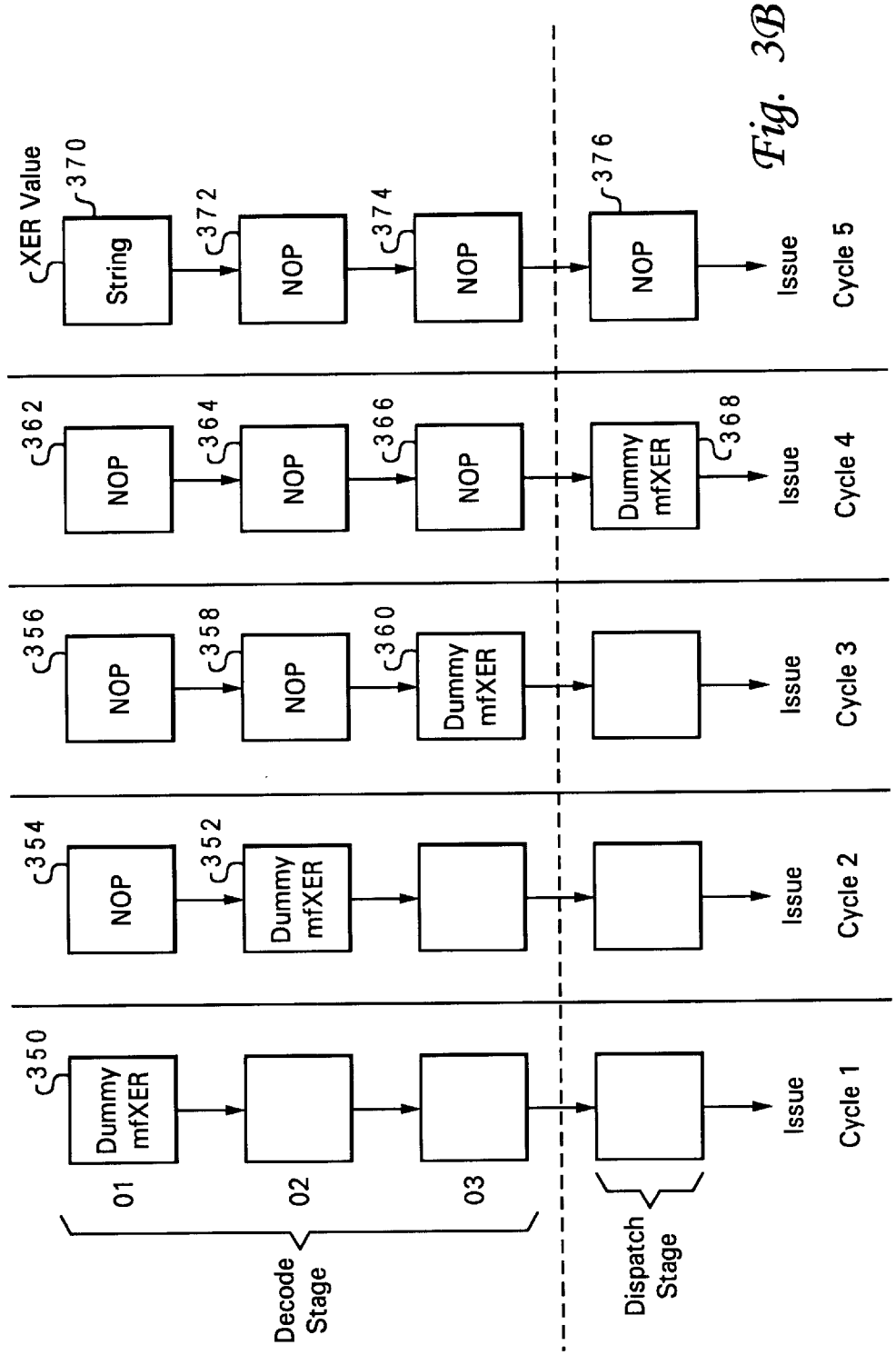
FIG. 3B depicts the pipeline stages that comprise the decode and dispatch stages of the processor implementing the method of a preferred embodiment of the present invention.

With reference now to FIG. 3B, there is shown the pipeline stages that comprise the decode and dispatch stages of the processor implementing the method of a preferred embodiment of the present invention. FIG. 3B shows the pipeline over a period of five clock cycles within the pipeline. As shown, the Decode Stage has three positions in the pipeline (01, 02, 03). As also shown, the Dispatch Stage has a single position in the pipeline.

In accordance with a preferred embodiment, and reading FIG. 3B in conjunction with FIG. 3A, the Dummy XER Read instruction ("Dummy mfXER") generated at step 306 in FIG. 3A enters the first position of the pipeline in the Decode Stage as shown at block 350 in the first clock cycle ("Cycle 1"). In the second clock cycle ("Cycle 2"), the Dummy mfXER moves down the pipeline to the second position in the Decode Stage as shown at block 352. The first of the NOPs instructions generated at step 308 enters the first position of the Decode Stage as shown at block 354. As shown in the third cycle ("Cycle 3"), the second NOP generated at step 308 enters the pipeline at the first position at the Decode Stage at block 356. The NOP and Dummy mfXER previously loaded in the pipeline during Cycle 2 moved down the pipeline into the second and third positions in the Decode Stage (blocks 358 and 360, respectively).

As seen at Cycle 4 of FIG. 3B, the third NOP generated at step 308 enters the pipeline at the first position of the Decode Stage, as shown at block 362. The previous NOPs have moved down the pipeline into the second and third Decode Stages, as shown at blocks 364 and 366. The Dummy mfXER moves into the Dispatch Stage in Cycle 4, as shown at block 368. Upon receiving the mfXER instruction, the Dispatch Stage will check the scoreboard to determine if the XER is busy. If the XER is busy, the Dispatch Stage will halt the issuance of instructions and hold the Dummy mfXER from issuance until the scoreboard bit has been reset, indicating that the XER is no longer busy. This effectively will stall the pipeline, keeping the NOPs instructions in the Decode Stage and the Dummy mfXER in the Dispatch Stage, until the XER is no longer busy. The process as described in Cycle 4 is shown at steps 312 and 314 of FIG. 3A. As will be appreciated, the preferred embodiment described in FIG. 3B shows that three NOPs are generated at step 308 to fill the three positions in the Decode Stage as shown in Cycle 4. In alternative embodiments, the number of NOP instructions generated at step 308 will depend on the number of pipeline positions between the steps of fetching an instruction and the issuance of the instruction.

As shown in FIG. 3B, Cycle 5 depicts the fifth cycle of the pipeline, which is generated after the scoreboard bit has been reset and which causes the Dispatch Stage to issue the Dummy mfXER (thereby restarting the pipeline). At the first position of the Decode Stage shown at block 370, the X-form strings generated at step 310 are decoded into multiple string operations using the XER value obtained from the integer exception register. The three NOPs have moved down the pipeline as shown at blocks 372, 374 and 376. Over the next three cycles of the pipeline, these three NOPs are issued, bringing the X-form string of block 370 into the Dispatch Stage. From there, the Dispatch Stage will issue the X-form string operations into the issue queues of the processor, as is shown at step 316. Thereafter, each of the X-form string operations may be issued (out-of-order) and executed in the appropriate execution units, as is shown at step 318.

As will now be appreciated, rather than setting aside additional physical assets for a scoreboard to control XER instructions, a scoreboard "function" is provided by utilizing the ISU scoreboard. A scoreboard bit is generated and set if a "move to XER" instruction is detected (the XER is busy). When an instruction is decoded that reads the XER, the process of the preferred embodiment allows the processor to decode the instruction and generate an X-form string comprised of a number of smaller operations to perform the instruction. Once these X-form string operations are dispatched into the issue queues, they allow a much more efficient and higher performance execution in the processor. The enhanced performance comes from the ability of the issue queues to issue the various string operations out-of-order, as is most efficiently allowed for the given process, and by issuing the various string operations to multiple execution units to execute the operations in parallel. As will be appreciated, this enhanced efficiency could not be achieved in the prior art because an instruction that generates a string operation using the XER count would have to be sent as a single instruction through the Decode Stage and dispatched to a single execution unit for execution. The single execution unit would then break the instruction into the smaller individual operations to perform the instruction's function. By waiting until the execution stage to break the instruction into the X-form string, the processor would be assured that the correct value was in the XER at the point of execution because the instructions would be dispatched in-order. As can be seen, the present invention enables both the out-of-order execution of the instructions and facilitates enhanced performance of utilizing multiple execution units to execute a single instruction.

Referring to FIG. 4, a state machine diagram in accordance with the present invention is illustrated. State machine 400 is shown in a beginning "unknown" state 402. Unknown state 402 portrays, in this illustration, a transition state of state machine 400. If an X-form string has been executed, state machine 400 transitions to SB_CLR 406 (scoreboard clear) state. State machine 400 will also transition to SB_CLR 406 when an XER read (mfXER) instruction is decoded and will stay in that state until loads or stores are dispatched. When the loads or stores are dispatched, state machine 400 will transition to SB_ACTIVE 404 when an XER write is decoded and transition back to SB_CLR 406 when the XER write is executed. State machine 400 generates padding IOPs between the read XER IOPs and the X-form string for stalling the pipeline if the XER is busy.

It is important to note that those skilled in the art will appreciate that the mechanism of the present invention and/or aspects thereof are capable of being distributed in the form of a computer usable medium of instructions in a variety of forms, and that the present invention applies equally regardless-of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for emulating an integer exception register scoreboard, comprising the steps of:
    utilizing an Instruction Sequencer Unit scoreboard;
    setting a scoreboard bit in said scoreboard if a write to integer exception register instruction is detected; and
    generating an instruction string; and
    responsive to said scoreboard bit, padding said instruction string with dummy internal operations.

2. The method of claim 1, further comprising:
    generating a dummy read instruction to test said scoreboard bit;
    generating sequences of internal operations emulating X-form string instructions; and
    generating dummy internal operations for padding said X-form string instructions.

3. The method of claim 1, further comprising:
    generating said scoreboard bit to indicate said integer exception register is busy.

4. The method of claim 1, further comprising:
    generating and executing said padded string instructions to ensure said scoreboard bit is set when said X-form string internal operations are generated.

5. The method of claim 1, further comprising:
    clearing said scoreboard bit when a move to XER is executed.

6. An apparatus for emulating an integer exception register scoreboard, comprising:
    logic means for utilizing an Instruction Sequencer Unit scoreboard:
    means for setting a scoreboard bit in said scoreboard if a write to integer exception register instruction is detected;
    generating means for generating an instruction string; and
    responsive to said scoreboard bit, means for padding said instruction string with dummy internal operations.

7. The method of claim 6, further comprising:
    logic means for generating a dummy read instruction to test said scoreboard bit;
    logic means for generating sequences of internal operations emulating X-form string instructions; and
    means for generating dummy internal operations for padding said X-form string instructions.

8. The apparatus of claim 6, further comprising:
    logic means for generating said scoreboard bit to indicate said integer exception register is busy.

9. The apparatus of claim 6, further comprising:
    means for generating and executing said padded string instructions to ensure said scoreboard bit is set when said X-form string internal operations are generated.

10. The apparatus of claim 6, further comprising:
    means for clearing said scoreboard bit when a move to XER instruction is executed.

* * * * *